Sept. 18, 1934.　　　J. N. HELTZEL　　　1,974,240
ROAD JOINT MACHINE
Filed Aug. 6, 1931　　　6 Sheets-Sheet 1
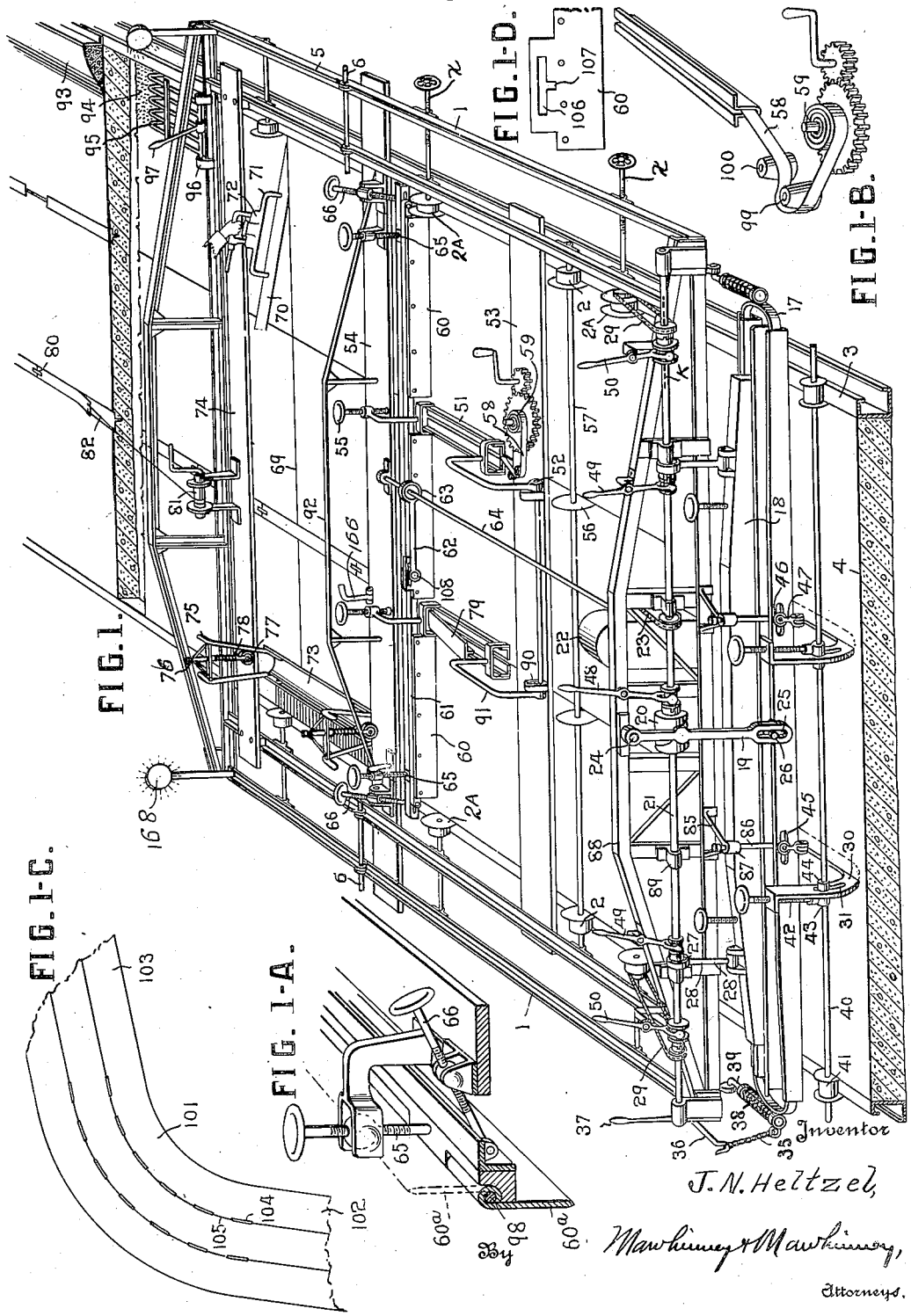

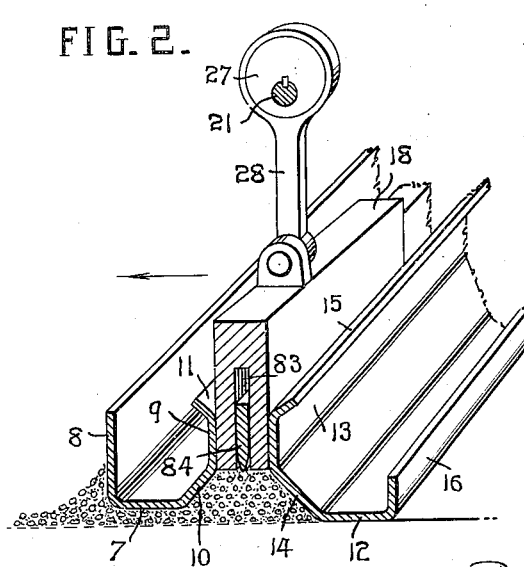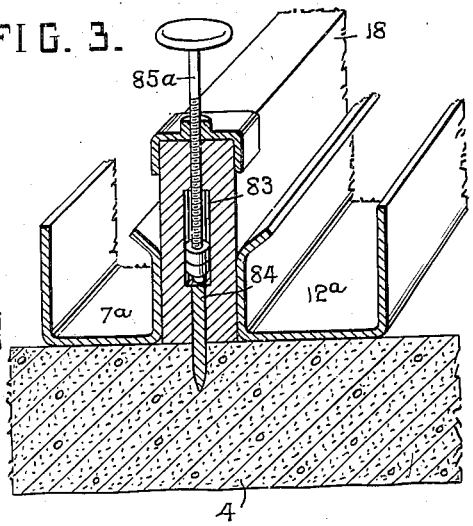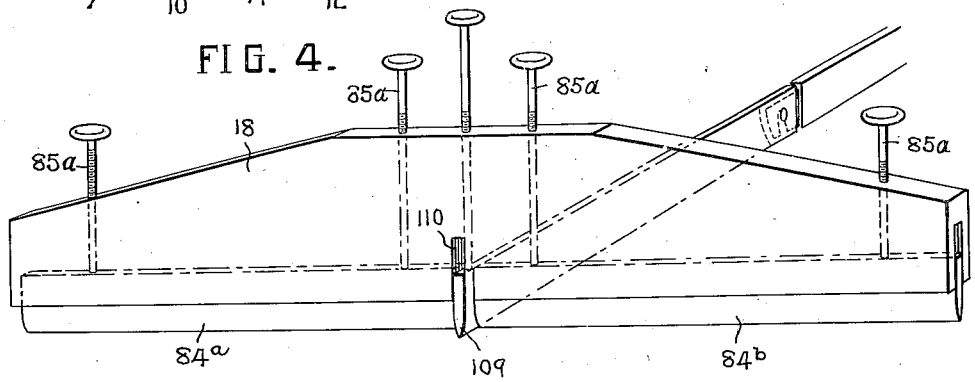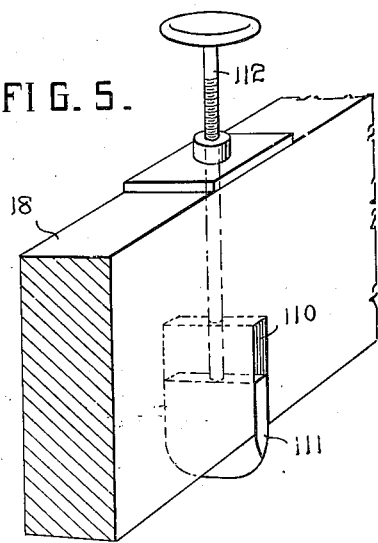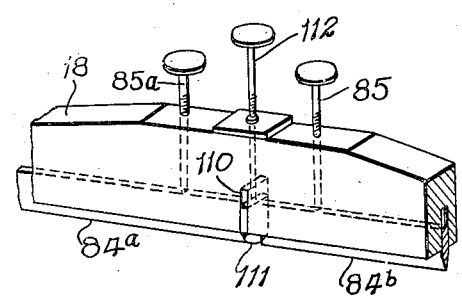

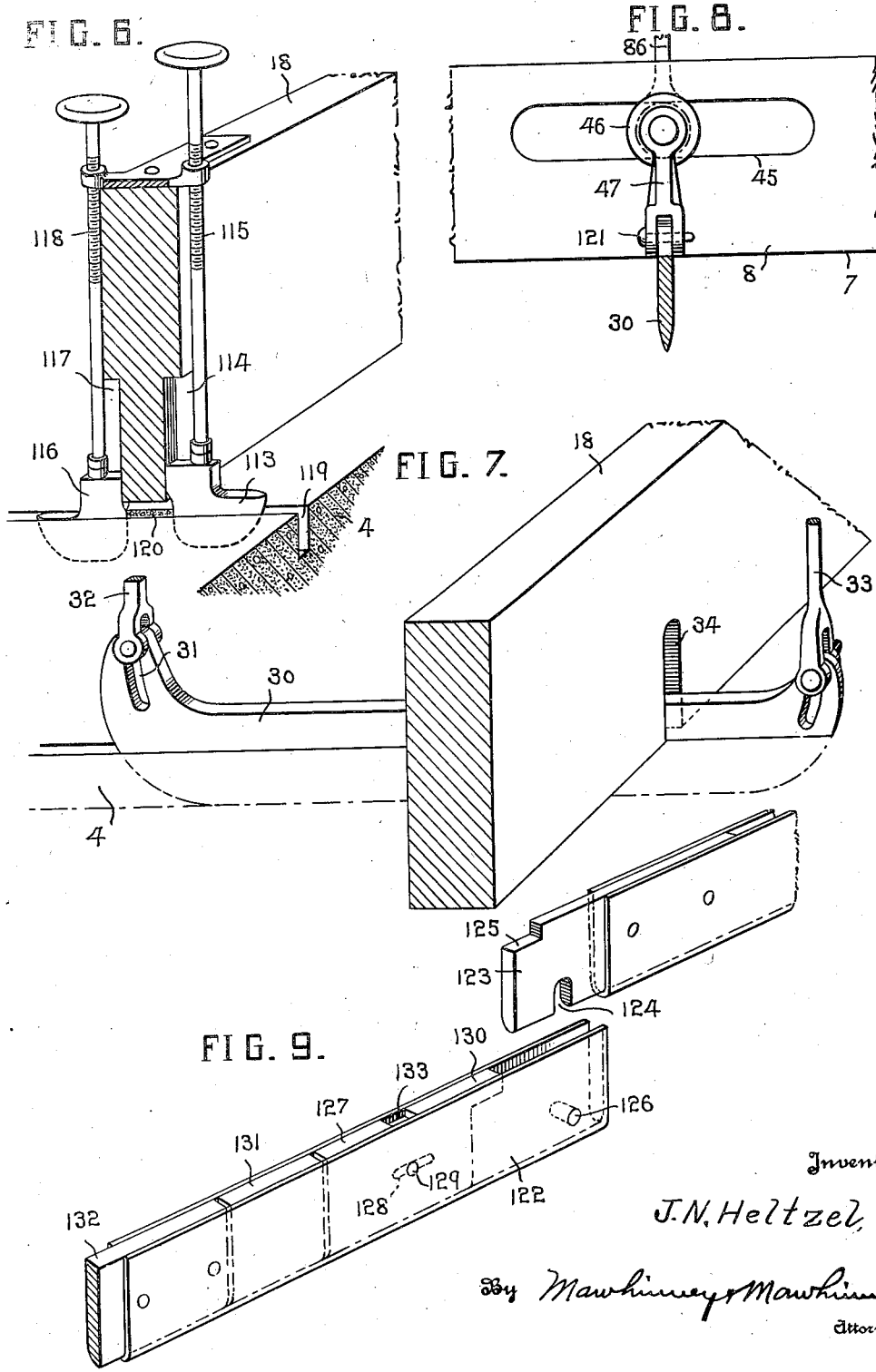

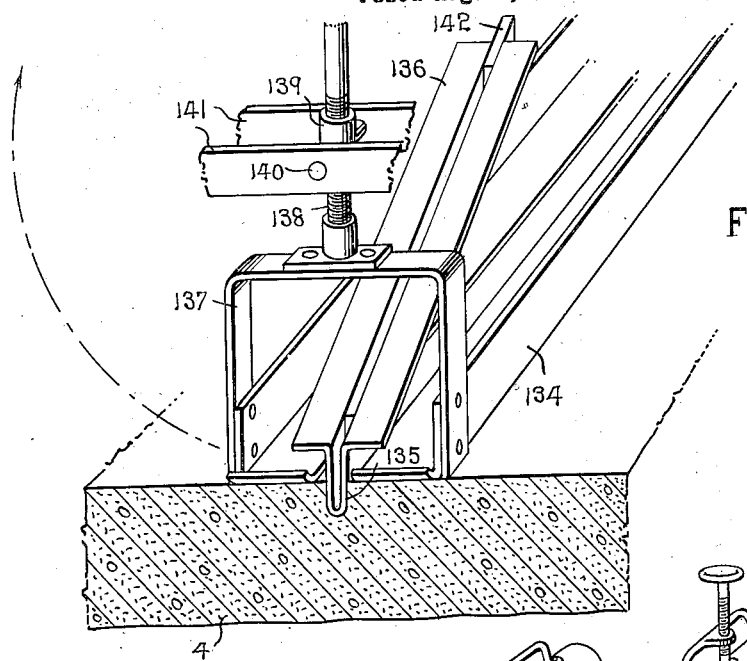
FIG.10.
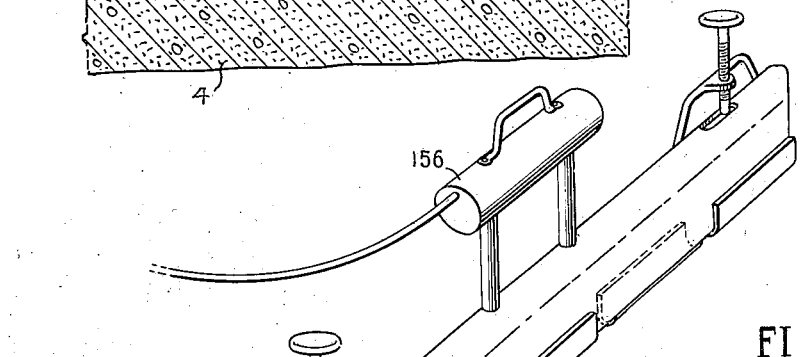
FIG.19.
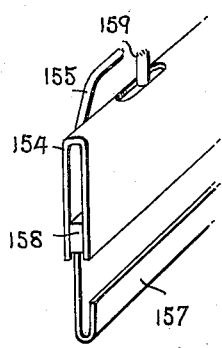
FIG.20.
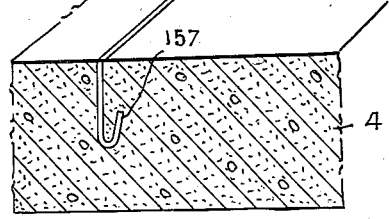
Inventor
J.N. Heltzel Sept. 18, 1934.  J. N. HELTZEL  1,974,240
ROAD JOINT MACHINE
Filed Aug. 6, 1931  6 Sheets-Sheet 5
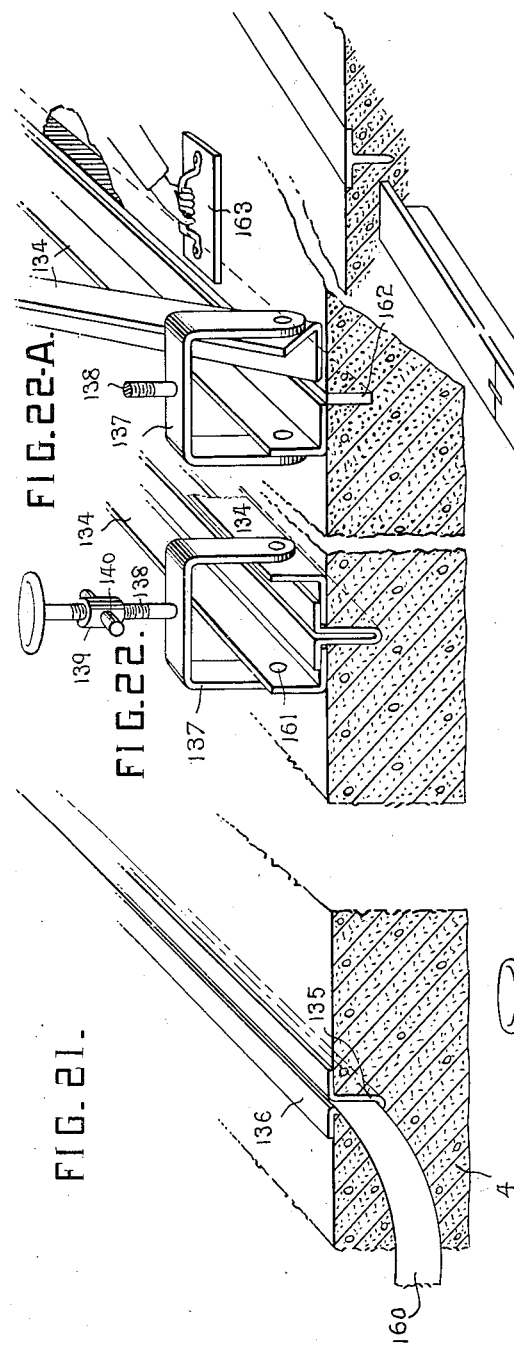
Inventor
J. N. Heltzel,
By Mawhinney & Mawhinney
Attorneys.

Sept. 18, 1934. J. N. HELTZEL 1,974,240
ROAD JOINT MACHINE
Filed Aug. 6, 1931 6 Sheets-Sheet 6
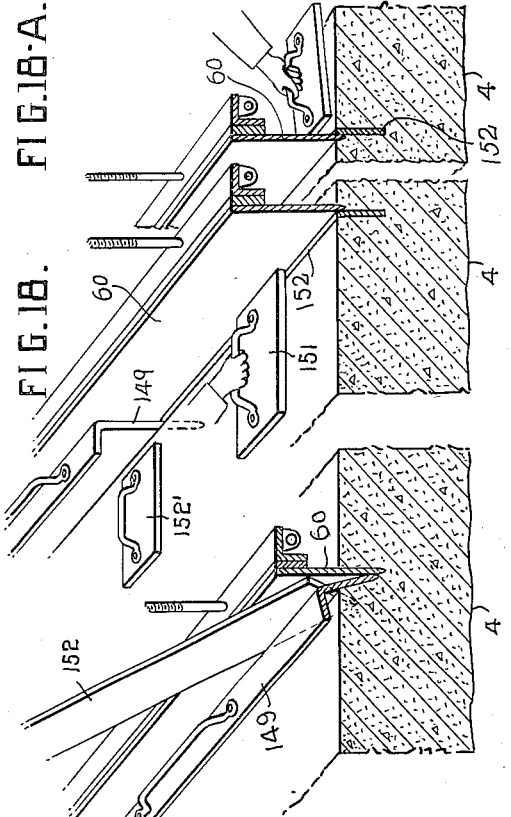
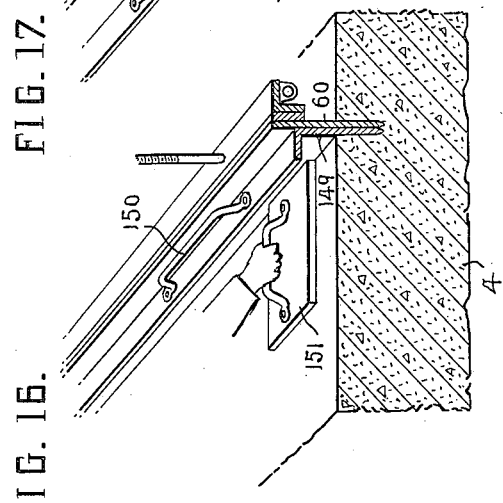
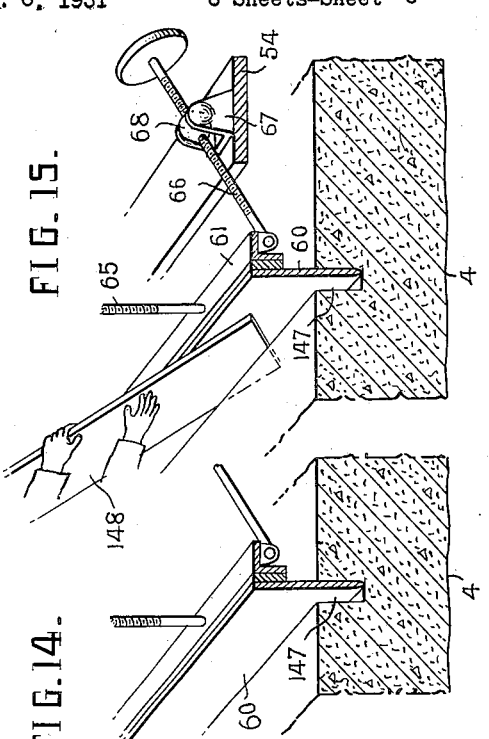
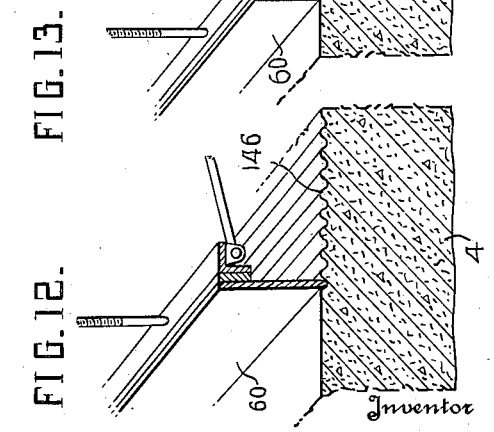
J. N. Heltzel,
By Mawhinney & Mawhinney,
Attorneys.

Patented Sept. 18, 1934

1,974,240

UNITED STATES PATENT OFFICE 1,974,240

ROAD JOINT MACHINE

John N. Heltzel, Warren, Ohio

Application August 6, 1931, Serial No. 555,619

30 Claims. (Cl. 94—39)

The present invention relates to improvements in joint machines, and more particularly relates to an improved machine for the mechanical installing of joints in concrete and other roads.

It is an object of the invention to provide a mechanically operated machine which will simultaneously screed off the concrete, tamp the same, and cleave the plastic concrete both longitudinally and transversely of the road, thereby producing longitudinal and transverse joints in the roadway to control the cracking of the structure after it has hardened.

Another object of the machine is to provide means whereby various types of joints may be installed and aligned with the same machine.

A further object of the invention is to provide means, to be used in combination with this machine, for the longitudinal floating of the surface.

A still further object of the invention is to provide an electric generating unit to operate the various devices electrically, to provide means for vibrating the various installing devices, and to furnish a lighting system for the apparatus.

A still further object of the invention is to provide an improved joint machine made in detachable sections whereby one section, carrying certain coordinate instrumentalities, may be operated back and forth along the roadway upon the side forms while the operation of the instrumentalities upon the disconnected section may be discontinued.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a perspective view showing an improved joint machine constructed according to the present invention.

Figure 1—A is a fragmentary perspective view, with parts shown in section, of a modified form of transverse cutter.

Figure 1—B is a perspective view showing a form of depositor with a ribbon joint strip feeding device.

Figure 1—C is a plan view of a curved roadway showing an arrangement of alternating wide traffic line on the curve.

Figure 1—D is a fragmentary front elevation showing the slot arrangement in the transverse cutter bar.

Figure 2 is a fragmentary perspective view, with parts shown in section, of an improved combined screed and tamper.

Figure 3 is a similar view showing a modified form of the device shown in Figure 2.

Figure 4 is a perspective view of the tamper showing both longitudinal and transverse joint cutting devices.

Figure 5 is a fragmentary perspective view of the tamper with a modified form of longitudinal cleaving device.

Figure 5—A is a similar view showing both longitudinal and transverse cleaving device.

Figure 6 is a similar view showing a further modified form of this device in connection with the concrete.

Figure 7 is also a fragmentary perspective view of the tamper with a preferred form of longitudinal cutter associated therewith.

Figure 8 is a fragmentary front elevation of the screed showing the slot and roller arrangement and the cutter in section.

Figure 9 is a fragmentary perspective view of the meeting ends of two of the joint members.

Figure 10 is also a fragmentary perspective view showing a portion of the joint installing device.

Figure 11 is a cross section through one of the side forms and a portion of the concrete roadway or slab with one of the improved wheels of the machine traveling on the form.

Figure 12 is a fragmentary perspective view, with parts shown in section, of a concrete slab with the transverse cutter shown as employed to rough same or form ridges therein.

Figure 13 is a similar view showing a degree of penetration of the transverse cutter in the road slab.

Figure 14 is a view similar to Figure 12 showing a longitudinal movement of the transverse cutter to provide a space forwardly thereof for the reception of joint material.

Figure 15 is a view similar to Figure 12 showing also one of the transverse platforms and longitudinal adjusting device for the transverse cutter, and also showing joint material in the act of being placed in the transverse cleft.

Figure 16 is a similar view to Figure 12 showing certain auxiliary devices.

Figure 17 is a view similar to Figure 12 showing a further phase of the operation with the joint strip installed between the transverse cutter and the auxiliary device.

Figure 18 is a view similar to Figure 12 showing the floating of the concrete at one side of the blade and joint.

Figure 18—A is a similar view showing the finishing operations at the opposite side of the cutter and joint.

Figure 19 is a fragmentary perspective view showing a vibrating form of joint installer.

Figure 20 shows a small fragment of the same indicating the manner of delivering the joint.

Figure 21 shows a portion of a slab with the longitudinal joint installer and joint material applied.

Figure 22 is a similar view with a modified form of joint installers applied thereto.

Figure 22—A shows a method of finishing with this type of installer, and

Figure 23 is a fragmentary perspective view of the device for dragging along the groove finishing sections.

Referring more particularly to the drawings, 1 represents the side frame members of a carriage mounted on the wheels 2—A, which wheels travel on the side forms 3 between which the concrete slab or road 4 is formed. The carriage 1 supports the various agencies for screeding, surfacing, cleaving and installing joints in the plastic concrete 4; and this carriage 1 includes a rear detachable section 5 which is hingedly connected, as indicated at 6 to the main carriage 1, being releasable and detachable at the flexible link or coupling, which provides for free lateral movement of the rear carriage with respect to the main carriage, by withdrawal of the pivot rod 6, whereby the main carriage 1 may be moved frontwards and backwards rolling along the side forms 3 while the rear section 5 of the carriage remains at rest or is removed from the job. In like manner the rear carriage section 5 may be moved independently over the road apart from the main carriage.

For instance the forward or main carriage 1 may be advanced to do the preliminary surfacing; while the rear carriage section 5 is left at rest; however, it may be preferable that the entire carriage with all units intact be operated back and forth over the road to surface, cleave and install joints and rescreed and surface over the installed joints.

The carriage supports a screed consisting of front and rear members, as shown more particularly in Figure 2. The front member includes a bottom 7, front vertical wall 8, and rear wall 9 including the sloping portion 10 and the inturned flange 11.

The rear screed member consists preferably of a bottom 12, front wall 13 including the sloping portion 14 and the inturned upper flange 15. A flange or rear wall 16 is provided at the rear edge of the bottom 12. The front and rear screed members are connected together, as indicated in Figure 1, by end members 17. Between the front and rear screed members is a slot in which a tamper member 18 is mounted to reciprocate up and down to tamp the concrete within the slot or channel. The screeds 7 and 12 are reciprocated transversely of the carriage and roadway by an arm 19 manipulated by a grooved cam 20 on a shaft 21 supported on the carriage. This shaft is driven from an engine or power plant 22 through the chain and sprocket connections indicated at 23. The arm 19 is pivoted to the carriage, as indicated at 24, and its lower end is provided with an elongated slot 25 to receive loosely therein a pin 26 upon the forward screed member.

The tamper 18 is of less length than the slot in the screed to permit of the lateral reciprocation of the screed without interference from the tamper. At the same time the tamper 18 may be reciprocated up and down, thereby tamping the surplus material that is reposed between the screeds. This vertical reciprocation of the tamper 18 may be had by eccentrics 27 carried on a transverse operating shaft 21 and connected by arms 28 to the tamper 18.

The machine travels forwards and backwards on the wheels 2—A being driven by chain and sprocket connections 29 coupling said wheels to the operating shaft 21 with provision for lateral reciprocation of 29 when lateral adjusting axle X is manipulated to adjust the carriage laterally on the side forms, the wheels 2—A having double flanges on the gauging side.

The machine is provided with one or more longitudinal joint cutting blades 30, which operate under the screed and tamper for cleaving the concrete longitudinally of the roadway. This cutter 30 is illustrated more particularly in Figure 7 as being rounded at both ends in order to pass back and forth through the concrete when the machine is moving both in a forward and rearward direction. The end portions of the cutter 30 are provided with slots 31 to receive the adjustable supporting connections 32 and 33 whereby the cutter may be raised and lowered. In this Figure 7 the tamper 18 is also shown as formed with a slot 34 to permit the reciprocating movement of the tamper and the vertical and longitudinal adjustments of the cutter member 30.

While provision has been made for simultaneously operating the screeds and tamper, it is to be understood that the screed may be operated while the tamper is at rest, or the tamper may be operated while the movement of the screed is suspended, and in fact while the screed is raised out of contact with the surface of the pavement by use of the chains 35 attached at the ends 17 of the screed and coupled to hook arms 36, which may be swung by handles 37 to effect the raising and lowering of the screed.

A spacer is connected to the frame of the machine and to the screed. This spacer includes a coil spring 38 wound about a rod 39. The spring will maintain the screed forward under tension but will permit it to be flexibly mounted whereby to give backwardly to a limited extent. Any other elastic tension device may be employed for this purpose.

As shown in Figure 1 the form of the blades 30 includes the forward slots 31 through which passes a guide shaft 40 having guide wheels 41 which run upon the side forms 3. The upper ends of the the cutters 30 receive the adjusting screws 42 which have a bearing upon the shaft 40. This bearing includes spaced collars 43 and 44 at opposite sides of the cutters 30 for the purpose of maintaining the longitudinal alinement of the cutters in the concrete 4 as the machine moves forwards and backwards. The elevation of the blades is controlled by the adjusting screws 42.

The surfacer or screed is also employed to support the intermediate or rear portions of the cutters 30, as shown in Figures 1 and 8. Slots 45 are provided in the front wall 8 of the front screed to receive grooved or flanged rollers 46 engaging the upper and lower walls of the slot 45 and permitting the screed 7 to reciprocate transversely while the cutter 13 remains in its longitudinal position of alinement.

A hanger member 47 extends from the roller 46 down to the cutter 30 and is secured to the cutter, whereby when the screed is raised out of contact with the surface of the road, the cutter or blade 30 will be automatically raised from the plastic concrete.

Clutches 48, 49 and 50 are provided upon the shaft 21 in connection with the various operating devices. The clutch 48 controls the actuation of the cam 20 and therefore of the transverse reciprocation of the screeds. The clutches 49 control the vertical reciprocating movement of the tamper 18; and the clutches 50 control the movement of the carriage. With regard to the clutches 49 it will be noted that these clutches and the operating eccentrics 27, 28 are connected with opposite end portions of the tamper 18. One or both clutches 49 may be engaged. In case both clutches are engaged, the tamper 18 will bodily, or as a whole, receive a vertical reciprocatory motion through the screed. If but one clutch 49 be engaged one end of the tamper will receive this vertical reciprocatory motion while the other end has no motion of its own but is substantially motionless. The eccentrics 27 may be so set angularly to one another that the reciprocation of opposite end portions of the tamper 18 may be alternate in character, that is, when one end of the tamper 18 is in contact with the concrete surface, the opposite end may be in the up position or out of contact with the concrete.

The machine is provided with one or more longitudinal joint installing members 51 of any approved type. The members, which may be trough or other shape, are preferably hinged, as indicated at 52 to an appropriate part of the carriage. Such members are positioned between the transversely extending platforms 53 and 54 and are arranged for vertical adjustments by screws or other means 55.

Discs 56 on a shaft 57 operate in line with the cutters 30 for the purpose of reforming the slot made in the concrete by said cutters 30 and opening such slot for the joint to be inserted by the joint installers 51 which follow the discs 56. Suitable joint strip 58 from a reel 59 is run through the joint installer or depositor 51, which may be tubular or trough shape as indicated in Figure 1—B and may be wound back on the reel and thereby withdrawn from the concrete and again released to be deposited in the concrete, it being understood that steel ribbon is preferable.

The machine is equipped with transverse joint cutting blades 60 which are reciprocated transversely of the roadway to cleave the concrete transversely, whereby to provide for the installation of such transverse joints as may be required. The joint blades are secured to a transversely reciprocating bar 61 reciprocated by the arm 62 from the eccentric 63 upon the longitudinal shaft 64; the shaft extending to the power plant 22.

When it is desired to cut the transverse joint, the machine is brought to rest and the blades or cutters 60, together with the bar 61 are lowered, so that the blades move down into the plastic concrete. This operation is accomplished by the vertical adjusting screws 65. The cutters or blades 60 may also be moved longitudinally of the roadway by the use of the screws or adjusting means 66, which are more particularly shown in Figures 1—A and 15. In these figures the platform 54 is shown as having a yoke 67 swivelly supporting a nut 68 threaded to receive the threaded shank 66 of the hand operated screw, providing a universal joint.

This shank 66 is pivoted to the bar 61 carrying the blades 60. After the cleavage has been made in the plastic concrete by the cutters or blades 60, the machine is moved forward so as to expose the transverse cleavage 69 into which suitable joint strip 70 is deposited by a depositing implement 71 having associated therewith an electric or other vibrator 72. The vibrator will enable the operator to place the joints in a semi-dry concrete where two grades of stone or coarse aggregate are used; inasmuch as highway departments are now specifying that two grades of aggregate be used and in addition to this, concrete of a minimum slump is being specified. A roller, float, or lute member 73 is supported by the rear section 5 of the carriage for transverse movement along the platforms 54 and 74. The float 73 is provided with handles 75 through which extend rods 76 carrying rollers 77 and having wound thereabout coil springs 78, whereby the handles 75 are supported on the platforms for rolling movement in a transverse direction and are yieldably supported, so that the lute 73 will be normally raised and the workmen will be required to depress the handles 75 against the actions of the coil springs 78 in order to force the lute 73 down into contact with the concrete, to float over the installed joints.

Various types of joint material may be installed. For instance the very thin steel strip of ribbon, such as shown at 58 may be inserted. This strip may be one hundred feet, more or less, in length and may be unwound from the reel 59, and may be rewound back upon the reel to withdraw the steel ribbon longitudinally from its position in the roadway in the plastic concrete, thereby producing a hair-line joint.

If desired short strips 79 may be inserted in the depositors 51. Such short strips may be of premolded material intended to be left in position in the roadway; or the strips may consist of heavier metal plate to produce a wide joint which strips are more particularly illustrated in Figure 9.

Such joint strip 79 may be of T-shape coupled together as indicated at 80. This joint strip 79 may also take the form shown more particularly in Figure 10 and may be trailed through the plastic concrete by a windlass 81 supported on the carriage; which windlass may be hand operated or power operated as desired.

A cable 82 is secured to the joint plates 79 for trailing the same through the concrete.

Braces 85 are mounted on the carriage for supporting the vertical posts 86 which carry the rollers 46. The vertical posts may be adjusted up and down so that when the screed is raised, the vertical posts 86 will slide through the hubs 87 on the braces 85.

A truss 88 on the forward portion of the carriage provides for supporting the main shaft 21 which has a number of bearings 89 affixed to said truss.

The pivot or shaft 52 for the joint installers is preferably disposed in bearings 90 having elongated slots whereby the yokes or arms 91 carrying the forward portions of the joint installers 51 may be adjusted up and down in such slotted bearings 90.

It will also be understood that the joint installers 51 may be swung upwardly about the pivotal point 52 and thrown back into an inoperative position.

There is also preferably a truss 92 to reinforce and support the platform 54.

Where it is desired to build a curb 93 rearwardly of the machine, after all of the surfacing is accomplished and the joints installed, it becomes necessary to rough up the surface of the road as indicated at 94. To accomplish this result there is provided a series of routers or roughing implements 95 upon the rear portion of the finishing machine. These routers are hinged as indicated at 96 to the machine, whereby they may be lifted out of contact with the pavement when desired, the lever 97 being provided for this purpose. The lever 97 is so arranged that it will contact with the frame of the machine to support the routers 94 at a predetermined position so as to gauge the distance that the routers will penetrate the concrete.

Referring more particularly to Figure 1—A, a modified form of transverse cutter 60ª is shown, the same being pivotally or hingedly supported as indicated at 98, whereby the same may be swung up into vertical position, as indicated by dotted lines or to any intermediate position. The cutter is reciprocated transversely as described in Figure 1 and has universal joints J and J—1 to permit universal movement of the cutter.

Referring more particularly to Figure 1—B the steel ribbon joint 58 is shown as being wound in a substantially reverse curve about a pair of rollers 99 and 100, so as to crimp or buckle the joint strip or turn the flatwise dimension of the strip into a substantially horizontal plane when the depositor is at a lower level than the ribbon roll 59. This will facilitate the bending of the steel joint strip 58 from the higher down to the lower level.

Referring more particularly to Figure 1—C, a special traffic line is shown for use on curves. The road indicated has a curved portion 101 and straight tangent portions 102 and 103 leading to the curved portion 101. On the curved portion 101 a wide traffic line 104 is installed alternately with a single line of joint 105. In other words alternate lengths of wide and narrow joint are used upon the curved portion of the roadway. On the straight portion of the roadway a single line of joint may be used as indicated.

Referring to Figure 1—D, the intermediate transverse blade 60 or its supporting member 61 is provided with an elongated slot 106 having a socket 107 leading to the slot 106 for receiving the pin 108 of the eccentric arm 62.

The pin 108 will engage the socket 107 when reciprocating the transverse cutters 60. When the transverse cutters are not being operated, the pin 108 will slide transversely in the elongated slot 106.

Further referring to Figure 2, it will be noted that the tamper 18 has a free up and down reciprocation between the vertical walls 9 and 13 of the screeds. The bottom 7 of the forward screed is raised above the form line and there is a space below the slot between the screeds in which to accumulate surplus material to facilitate the rapid surfacing of the concrete. This space, formed by the slot and by the sloping walls 10 and 14, will also serve as a means for accumulating surplus water, which will be drained from the surface of the roadway by the manipulation of the tamper and the screed; thereby forcing the water to the side of the road and causing same to drain off over the tops of the forms. The tamper 18 is shown as provided with a groove 83 to receive therein an adjustable joint cutting blade 84. This blade is shown as completely contained within the groove 83, where it may repose during periods of inactivity. By drawing the blade 84 out, the act of tamping will perform the further function, through this blade 84 of separating large aggregate and in effect forming a transverse joint for the reception of transverse joint strip, either before or after the slot has been reformed by the transverse cutters 60.

Referring to Figure 3, a modified form of screed is shown in which the front screed member 7ª extends down to the form line in the same manner as the rear screed member 12ª. In this instance the cutting blade 84 is made adjustable by means of an adjusting screw 85ª mounted through the tamper 18. The blade 84 is shown projected below the bottom surface of the tamper 18 and entering the concrete slab 4 below the form line whereby to cut a transverse joint. By manipulating the screw 85ª through its hand wheel the blade 84 may be drawn up completely within the slot 83.

Referring more particularly to Figure 4, this figure shows more particularly two transverse blades 84ª and 84ᵇ carried by the tamper 18 together with the joint strip 109 mounted through the central slotted portion 110 of the tamper 18. The joint strip 109 is mounted in sections as indicated. Such joint strip may be of the form shown in Figure 9. Adjusting screws 85ª in the tamper 18 may be turned to independently raise and lower the blades 84, 84ª and 84ᵇ.

Referring more particularly to Figure 5 the tamper 18 is shown with a longitudinal opening 110 for receiving the longitudinal cutting blade 111 for projecting below the tamper 18 to separate the coarse aggregate longitudinally of the roadway under the tamper and simultaneous with the operation of the tamper to compact the concrete.

The blade 111 may be raised up into the slot 110 so that the blade will not project beyond the bottom surface of the tamper. The adjusting screw and hand wheel 112 provide for the raising and lowering of the blade 111.

Figure 5—A shows the tamper 18 equipped both with the transverse cutting blades 84ª and 84ᵇ of Figure 4 and the longitudinal cutting blade 111 of Figure 5.

Referring more particularly to Figure 6, there is here shown a modified form of longitudinal cutter 113 adjustably mounted in a groove 114 upon the front face of the tamper 18. This blade 113 is adjusted up and down by means of the adjusting screw 115 and its hand wheel. If desired there may also be provided a rear blade 116 mounted to reciprocate in a slot 117 in the rear face of the tamper 18 and adjusted by means of an adjusting screw and its hand wheel 118. In this Figure 6 is also shown the concrete slab 4 and the mortar joint 119 produced by the device. The tamper may be reciprocated up and down, either while the machine is in forward or backward movement, and if it is desired to use the cutter 113 forwardly of the tamper to cut the groove, this cutter is lowered below the lower surface of the tamper 18 by the adjusting screw 115. The cutter 113, receiving a reciprocating motion that the tamper 118 will separate the coarse aggregate, inducing mortar and the lighter material to flow back into the groove 119 into which it is intended to insert joint. The action of the tamper upon the surface of the concrete will further induce the mortar to flow into the groove.

Where a rear blade 116 is employed, such blade will operate in the mortar to open up the joint. The mortar is indicated at 120 as having flowed in behind the front blade 113.

In Figure 7 the blade 30 may in some cases project above the top surface of the concrete slab 4. To permit this a slot 34 is provided in the tamper, which allows the tamper to operate upon the top surface of the concrete, thus tamping closely upon both sides of the blade 30, compacting the coarse aggregate and producing an armored surface longitudinally along the joint, forcing the coarse stones up in contact with the joint to produce a very dense structure at and along the joint groove. The slot 34 will provide means for the raising of the joint blade 30 out of contact with the concrete when desired.

Referring to Figure 8, the screed 7 may reciprocate, the double flanged roller 46 moving in the slot 45, or rather the slot 45 moving back and forth with respect to the roller 46, which rolls upon the walls of said slot. This permits the blade 30 to maintain its longitudinal position gauged from the side forms while it is being moved longitudinally in the plastic concrete simultaneously with the reciprocating movement of the screed.

This construction also permits the blade 30 to be automatically withdrawn from the concrete when raising the screed. Should it be desired to disengage the screed from the blade 30, this can be accomplished by removing the pin 121 which will permit the separation of the blade 30 from the arm 47.

Referring to Figure 9, there is represented one of the longitudinal joint members, which is constructed of a number of sections, fragments of two of which are shown. These sections are detachably coupled together for trailing through the plastic concrete longitudinally of the roadway. The sections are composed of substantially U-shaped metal or other members 122 which form parallel side plates between which is an unobstructed slot in one end of the section, while the other end of the section carries a bar or tongue 123 projecting from the section and adapted to enter the slot in an adjacent section. The bar 123 may be secured in the section in any appropriate manner, as for instance, by riveting or welding. The projecting end of the bar is formed with a notch 124 in its lower edge and is also cut away as indicated at 125 in its upper free corner. The notch 124 is adapted to be received over a dowel or locking pin 126 projecting across the slot in the companion section.

This pin 126 may be welded or otherwise secured to the vertical webs of the U-member 122. Back of the slot, the joint section contains a sliding plate or block 127 in which is made a longitudinal slot 128 for receiving a pin 129 secured in the walls of the section. The plate 127 is provided with an offset or overhanging portion or ledge 130 to occupy the cutaway part 125 of the tongue 123. Behind the plate 127 is a rubber or other resilient block 131 whereby to urge the plate 127 outwardly toward the slot, the plate 127 being guided in its movement by the pin 129. The rubber block will hold the plate 127 up to locking engagement with the tongue 123, the overhanging part 130 preventing the notch 124 from withdrawal from the pin 126 until the locking plate 127 is withdrawn backwardly in opposition to the expansive action of the rubber block 131; whereupon the tongue 123 may be lifted directly upward and freed from the pin 126. The rubber block 131 will also prevent concrete from flowing in to the slot or recesses about the various members and the slot, of course, must be free of concrete to permit the longitudinal movement of the sliding member 127. The filler bar is represented at 132 which filler bar may or may not extend the entire length of the section and terminate in the tongue 123.

The locking plate 127 is notched as at 133 to receive a suitable implement whereby the plate 127 is forced back against the rubber mat 131. The rubber will offer little or no resistance to the backward movement of the member, thus allowing the disengagement of the interlocking parts of the joint sections.

Referring more particularly to Figure 10, there is herein shown more particularly one form of installing chute used for installing joint blades, for instance, such as the T-shaped joint blades 79 indicated in Figure 1. This chute is constructed of angular or other members 134 having their horizontal webs presented toward one another but spaced apart at their adjacent edges to provide a slot over the groove or zone in the roadway in which it is desired to deposit the joint strip or joint material. The vertical webs of the chute members are presented outwardly. The joint member is shown as constructed of substantially U-shape having a web part 135 and flanges 136. The device may be positioned between the guide members 134 as indicated. This construction is also useful for installing joints transversely of the roadway. The installing chute or device may be carried in one or more yokes 137, the legs of which are riveted or otherwise secured to the vertical webs of the guide members 134 and thus do not interfere with the insertion of the joint strip 135.

The yokes are suspended from adjusting screws 138 having hand wheels and being mounted in appropriate parts of the framework. Adjusting screws 138 are shown as passing through swivel nuts 139 which nuts are freely rotatable upon the pins 140 held in the frame members 141, which frame members are a part of the carriage. As indicated by the broken line, the entire installing device may be swung upwardly and outwardly on the center 140 away from the concrete slab 4 and away from the zone of the joint to permit of finishing operations and remove any interference with those operations by the installing chute. Of course, the chute will be raised from the concrete a desired distance before swinging the same clear of the joint zone. The joint plate may also have the tongue or projection 142 for the purpose of fitting on to another section whereby the joint plates may be extended for any requisite length.

Referring more particularly to Figure 11, 2 designates the wheels of the carriage mounted upon the axles 143 and having the outer flanges 144 for engaging the side forms 3 of the road 4. These wheels are shown as provided with deep inside flanges 145 which project down along the inside face of the form 3 between the form and the concrete slab 4 for the purpose of spading the concrete adjacent to the inside face of the form rail.

Referring more particularly to Figure 12, there is shown one of the transverse blades 60 positioned to contact with the concrete only slightly. While this blade or cutter 60 is reciprocated transversely of the roadway, corrugations 146 are formed in the surface of the road as is required in concrete bases for bituminous surface roads.

Referring more particularly to Figure 13, one of the transverse blades 60 is represented as forced into the plastic concrete 4 to produce a separation of the coarse aggregate.

Referring to Figure 14, the blade 60 is represented after it has been moved longitudinally of the roadway or at right angles to its length whereby to produce a space or groove 147 along the blade 60 to receive joint strip.

Figure 14 shows the adjusting screw 66 for the purpose of adjusting the blade 60 at right angles to its length in order to produce the slot or groove 147 alongside the blade 60. This figure also shows the joint strip 148 being inserted into the groove 147 guided by the blade 60 to be worked into the concrete by reciprocating the blade transversely and agitating the plastic concrete while the operator by manual manipulation of the strip will recede down into the concrete.

Referring more particularly to Figure 16 this figure shows a further method of inserting ribbon joint strip, wherein the blade 60 is forced into the plastic concrete to separate the coarse aggregate, after which a second or auxiliary blade 149 having a handle 150 is placed against the blade 60 and forced down into the concrete adjacent to said blade 60, and while the blade 60 remains in position in the concrete.

A float or hand finishing tool 151 may be used for floating and smoothing of the concrete adjacent the blade 149.

Figure 17 represents the next step wherein the hand blade 149 is separated from the main blade 60 and a joint strip 152 is positioned between the blades and forced down into the concrete.

In Figures 18 and 18—A is illustrated the final operation, which consists in moving the blade 149 back along the face of the main blade 60 with the joint strip 152 lying between the two blade members. The main blade 60 is raised, but not completely out of the concrete and it forms an abutment against which the inserted joint strip 152 may engage whereby to hold the joint strip to a true line during the smoothing and compacting of the concrete which is accomplished by the hand tools 151 shown. The hand tool 152' is used for smoothing and compacting the material against the blade 149 which will prevent any concrete from lodging between the joint strip 152 and the surface of the blade 60. The blade 149 is then withdrawn entirely from the concrete and the main blade 60 is raised to the position shown in Figure 18, whereupon the tool 151 is utilized to accomplish the final surfacing operation at one side of the joint strip.

Figure 18—A shows that the main blade 60 has been raised entirely from the concrete and has been moved to the other side of the inserted joint strip 152; whereupon it is lowered so as to engage the opposite edge of the joint strip whereby it will form a backing to hold the joint strip to position while the surface material of the concrete is being floated and compacted upon the other side of the joint.

It will be understood that the devices and methods illustrated in Figures 12 to 18—A inclusive may be utilized for installing either longitudinal or transverse joints.

Referring more particularly to Figure 19, this figure shows a more detailed description of the vibrating apparatus for installing transverse or longitudinal joints. According to this method very thin ribbon joint, indicated at 153 may be installed, by the device which consists generally of an inverted U-shaped shield or containing member 154 having handles 155 secured thereto and also having an electric vibrating device 156 affixed thereto. The joint strip 153 is inserted between the spaced walls of the containing member 154 and this joint strip is preferably permitted to project below the joint installer, as shown by the upwardly overlapping end portions 157, which when forced into the concrete will assume the position indicated.

The curled up portion 157 will serve to retain the joint strip in the plastic concrete while the installing member 154 is being withdrawn. In the containing member is a kick-off or expelling bar 158 mounted to move up and down within the bar as indicated in Figures 19 and 20 and having adjusting screws 159 provided with operating hand wheels, which screws are threaded through the handle members 155 or other fixed parts.

Figure 20 shows the expelling bar in the lower position whereby the strip is forced into the concrete or whereby the strip is held in the concrete while the joint installing device is lifted out of the concrete.

It will be understood that this device may be used either with or without the vibrator 156 but with the vibrator will aid in the insertion of the device in the concrete. The device may also be used for installing either longitudinal or transverse joint.

Referring more particularly to Figure 21 this view represents a section of the concrete slab or road 4 with the T-shaped installing blade 135 therein having the flanges 136 overlapping the surface of the concrete at opposite sides of the joint.

At 160 is shown a steel ribbon or other suitable joint being passed through the tubular or trough shaped member 135 to be deposited in the concrete.

Figures 22 and 22—A show a device similar to Figure 10 with parts similarly numbered; the only modification being in the use of pivots 161 at the base of the yoke 137. When the installing device is raised, it may be swung on the hinge 140 and moved laterally so as to facilitate the finishing of the surface along the joint. The longitudinal bars 134 may be utilized independently of one another by virtue of the pivot joints 161. In Figure 22—A one of the bars 134 is shown as raised so that the joint strip 162 is exposed at one side whereby finishing up to and along the joint strip and above same may be accomplished by the hand tool 163 or other appropriate tool while the opposite bar 134 engages the opposite side of the joint strip 162 to hold same accurately to a straight line position. After the joint is finished at one side, that bar 134 may be lowered about the hinge or pivot 161 and the companion bar at the other side raised whereupon the finishing may be carried out at that side. Of course, both bars 134 may be raised simultaneously if desired by the operator or they may be raised only alternately.

Referring more particularly to Figure 23, sections of joint strip 79 are shown being removably coupled together as indicated at 80, this joint strip being shown in Figure 1. The foremost part of the first joint strip is provided with a slot 164 adapted to receive the forwardly projected end of a hook 165 on the lower end of an adjustable bar 166 carried by the framework of the machine.

An adjusting screw 167 may be employed for raising and lowering the hook bar 166. By this means as the carriage is advanced a suitable length of joint strip may be trailed along after the machine in the groove which has been previously routed out or reformed by the cutters 56. The joint strip 79 will thus reform and provide a suitable joint for the installation of joint material. The head piece 162—A is capable of lateral adjustment by the slots 167—B in the frame of the carriage.

Lamps or other illuminating devices 168 may be erected at the corner or other portions of the carriage with the light rays focused inwardly upon the machine and upon the work whereby operations may be conducted conveniently at night. The power plant 22 may consist of a complete electrical installation including generators or other source of current for lighting the lamps 168 and for producing the power necessary to the various functions above described.

It is obvious that various changes and modifications may be made in the details of construction and design of the above specifically described embodiment of this invention without departing from the spirit thereof, such changes and modifications being restricted only by the scope of the following claims:—

What is claimed is:

1. In a road building machine, slotted screeding means, and a compacting tamper substantially filling the slotted portion of said screeding means and movably mounted through said screeding means.

2. In a road building machine, a screed, a tamper adjacent with the screed, and grooving means carried by the tamper for preparing grooves in the plastic concrete for receiving expansion joints.

3. In a road building machine, a transversely-reciprocated screed having a slot therein, and a reciprocating tamper moved through the slot in the screed.

4. In a road building machine, a screed consisting of front and rear members with an opening between the same, and a reciprocating compacting tamper substantially filling the opening between said members and operating through the opening.

5. In a road building machine, a screed consisting of connected front and rear members with an opening between the same, a tamper movably mounted between said members and operating through the opening, means for reciprocating said tamper, and an adjustable cutter carried by said tamper and projecting downwardly therefrom.

6. In a road building machine, a screed, a tamper moving through said screed to act upon the concrete below the screed, and transverse and longitudinal cutting means carried by said tamper.

7. In a road building machine, a screed having an opening therethrough, a tamper moving through the opening in the screed, means for reciprocating said tamper, an adjustable longitudinal cutting device carried by said tamper, and adjustable transverse cutting devices also carried by said tamper at opposite sides of the longitudinal cutting device.

8. In a road building machine, a unitary screed comprising front and rear members with a slot between the members, the forward member extending at a higher elevation than the rear member, and a tamper substantially filling the space between the screed members working between said members.

9. In a road building machine, a movably supported tamper, and longitudinal and transverse cutting devices adjustably carried by said tamper.

10. In a road building machine, a screed composed of forward and rear members with an opening therethrough, a tamper operating through the opening between the members, the forward member having its lower portion raised above the lower portion of the rear member, and the rear member having a forward sloping portion leading down to a substantially level portion.

11. In a road building machine, a frame adapted to travel back and forth on the side forms above the concrete road, cutting means adjustably carried by said frame for forming a cleft in the plastic concrete, a slotted tamper projecting above and receiving said cutting means, and means for suspending and reciprocating said tamper.

12. In a road building machine, a tamper, and adjustable cutting members disposed in substantial alignment at opposite sides of said tamper.

13. In a road building machine, a tamper, and independently adjustable cutting members disposed in alignment at opposite sides of said tamper for adjustment at different elevations.

14. In a road building machine, a transversely reciprocating screed, and cutting means carried by said screed.

15. In a road building machine, a transversely reciprocating slotted screed, a cutting member extending beneath said screed, and a roller support operating in the slot of said screed for supporting said cutting member.

16. In a road building machine, a transverse cutter, and means for shifting said cutter longitudinally to provide a cleft beside the same to install joint material guided by said cutter.

17. In a road building machine, a cutter, and means for moving said cutter bodily at substantially right angles to its length to provide a cleft in the slab adjoining said cutter in which to install joint material guided by said cutter.

18. In a road building machine, a cutter member, and means for shifting said cutter member from one side to the other of a joint in the roadway to permit alternate finishing up to the joint opposite said cutter member.

19. In a road building machine, a carriage adapted to roll back and forth on the side forms, a cutter on the carriage, a screed behind and above the cutter, a tamper adjacent with the screed, and joint installing means behind said screed and tamper.

20. In a road building machine, a carriage, adapted to travel back and forth a number of times on the side forms, a cutter adjustably carried by said carriage, means for preserving the longitudinal alignment of said cutter, a transversely reciprocable screed behind and above said cutter, a vertically reciprocating cutter adjacent with said screed, and joint installing means on said carriage in alignment with said cutter.

21. The herein described method for building roads, which consists in moving a cutter back and forth through the concrete to remove the coarse aggregate and form a mortar joint, screeding and tamping the concrete above and behind the cutter, reforming the slot in the mortar joint, and installing joint material in the reformed slot.

22. The herein described method for building roads, which consists in moving a cutter back and forth through the concrete, screeding the concrete above and back of the cutter above the surface level of the road, tamping the concrete back of the screeding operation, and performing a second screeding operation back of the zone of tamping and down to substantially the surface level of the road.

23. The herein described method for building roads, which consists in inserting a blade in the concrete, moving said blade at substantially right angles to its length to provide a groove adjacent said blade and inserting joint material in the groove guided by said blade.

24. The herein described method for building roads, which consists in reciprocating a cutter blade in the concrete, moving said cutter blade at substantially right angles to its length to widen the groove, inserting joint material in the groove guided by said cutter blade, and finishing at opposite sides of the joint material while the cutter blade is disposed against the joint material.

25. The herein described method for building roads, which consists in inserting a blade in the concrete, inserting a second blade and rotating the same away from the first mentioned blade, and inserting joint material between said blades.

26. The method of installing joints in concrete surfacing structures, consisting of first moving a blade down into the plastic concrete and reciprocating the blade transversely and simultaneously applying a joint strip parallel and adjacent to the side of the blade so that the agitation of the blade will cause the joint strip to recede or settle into the plastic concrete along the blade by manual cooperation with the mechanical reciprocation of the blade.

27. A road building machine, comprising a wheeled carriage operating on side forms and spanning a roadway under construction, a screed member carried forwardly of the carriage to operate on the plastic concrete, and longitudinal and transverse joint cutting and installing means carried by the carriage for the installation of joint material in the plastic material followed by a longitudinal surfacer to surface over the joint material and means for movement of the carriage over the roadway.

28. A road building machine comprising a transversely reciprocating screed having a slot in its intermediate portion, a vertically reciprocated tamper operating through the slot, transverse cutting means carried by said tamper, and longitudinal cutting means extending beneath the screed and tamper.

29. A road building machine comprising a transversely reciprocating screed having a slot in its intermediate portion, a vertically reciprocated tamper operating in said slot, transverse cutter means carried by said tamper, longitudinal cutting means engaging beneath the tamper and screed, and means for maintaining the longitudinal alinement of said longitudinal cutting means.

30. The herein described method for building roads, which consists in cleaving the concrete, screeding the concrete above the cleavage and tamping the concrete in the zone of screeding.

JOHN N. HELTZEL.